May 29, 1928.  1,671,521

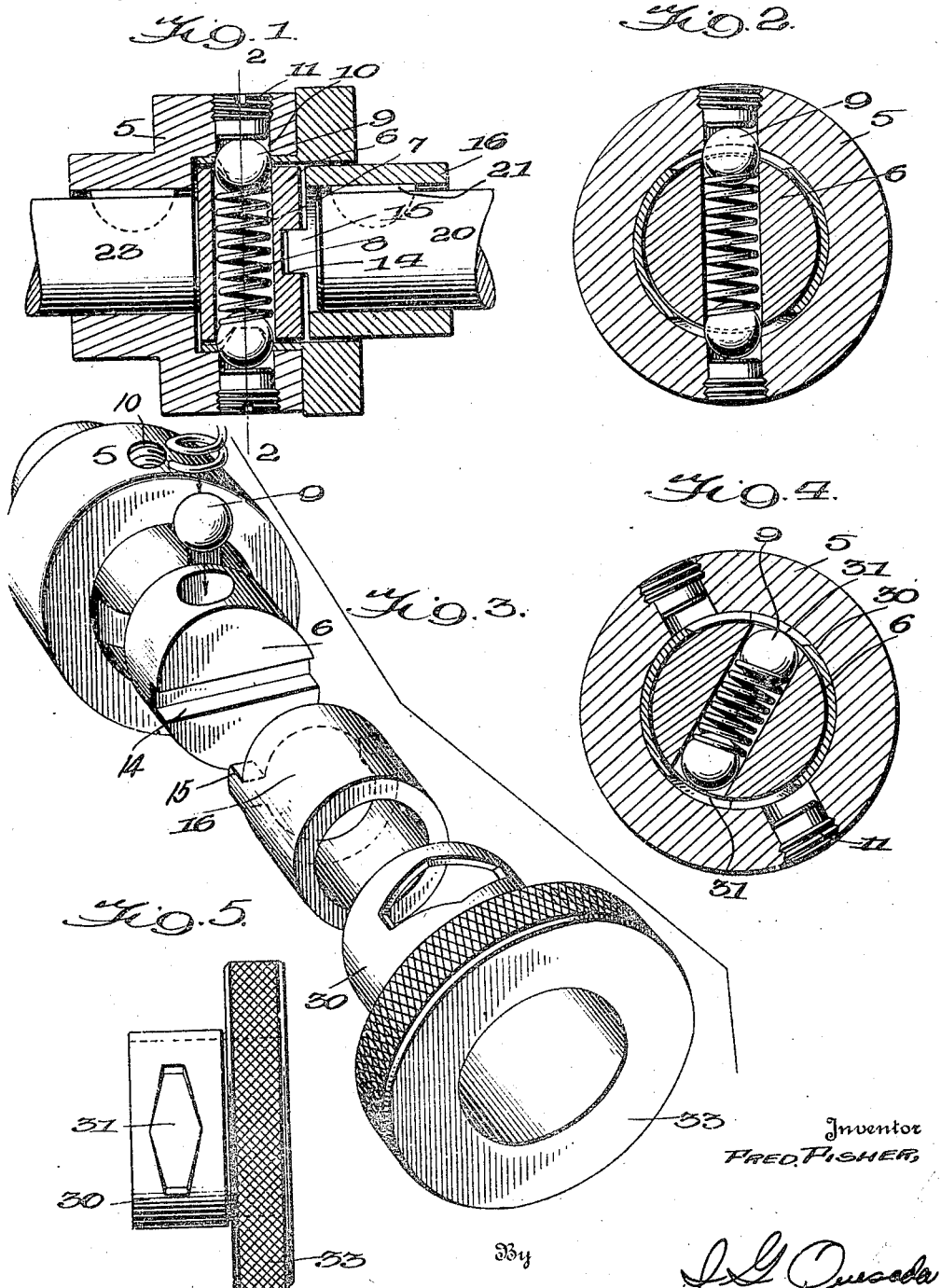

F. FISHER

SHAFT COUPLING

Filed Nov. 26, 1926  2 Sheets-Sheet 2

Inventor
FRED FISHER,

Patented May 29, 1928.

1,671,521

UNITED STATES PATENT OFFICE.

FREDERICK FISHER, OF LAKE BLUFF, ILLINOIS, ASSIGNOR TO McCROSKY TOOL CORPORATION, OF MEADVILLE, PENNSYLVANIA.

SHAFT COUPLING.

Application filed November 26, 1926. Serial No. 150,805.

This invention relates to shaft couplings and more particularly to a means for breaking the driving connection when the torque exceeds a predetermined point and for compensating for misalignment of the driving and driven members.

A further and equally important object is to provide a shaft coupling having novel means whereby the driving connection will remain broken until such time as the driving units are manually restored to operative position.

Another aim is to provide a coupling of the character specified which may be economically incorporated in a drive line to avoid the possibility of damage to the driven unit such as an electric motor, a phonograph motor, printing presses, taps, reamers and various kinds of machinery.

Other objects and advantages will be apparent during the course of the following description.

In the accompanying drawings forming a part of this application and in which like numerals are employed to designate like parts throughout the same, Figure 1 is a vertical sectional view through the improved coupling in use.

Figure 2 is a vertical transverse sectional view taken on line 2—2 of Figure 1.

Figure 3 is a group perspective of the improved coupling.

Figure 4 is a vertical transverse sectional view showing the driving balls in inoperative position.

Figure 5 is a side elevation of a restraining sleeve by which the driving connection remains broken subsequent to an increase in torque above a predetermined point until such time as the drive is restored by an attendant.

Figure 6:
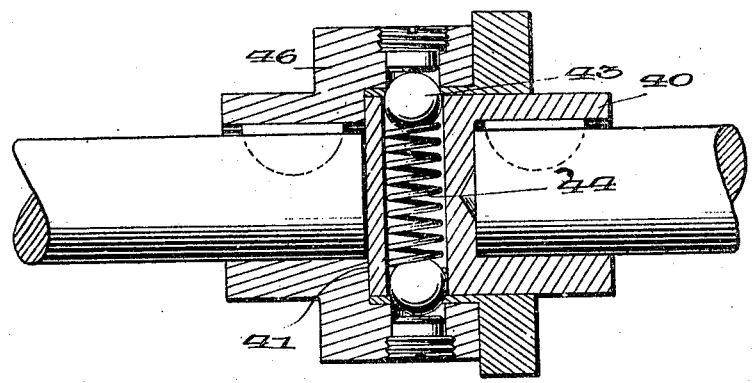
Figure 6 is a vertical sectional view through a modification of the invention.

In the drawing the numeral 5 designates a driving element in the nature of a housing having a recess in one end thereof for the reception of a floating driven element 6.

In carrying out the invention the element 6 is made in the form of a cylinder and has an opening 7 extending diametrically therethrough to receive an expansion spring 8 and a pair of driving keys in the nature of balls 9. Of course the spring 8 and the driving balls 9 are of a degree of hardness sufficient to withstand the strain to which the same are subjected.

The coil spring 8 urges the balls 9 outwardly into sockets 10 in the driving element 5 and the extent to which the balls 9 may enter the sockets 10 is governed by set screws 11 threaded into the outer portions of the sockets 10. Thus an adjustment of the set screws 11 determines the angle of contact of the balls 9 with the walls of the openings 10. In operation it is a simple matter to adjust the set screws 11 to bring about a cessation of the drive when the torque exceeds a predetermined point. It is believed to be clear that by moving the set screws 11 or other retainers inwardly the clutch feature of the invention is rendered more sensitive. By the same token when the set screws 11 are moved outwardly the clutch feature is rendered less sensitive.

The driven floating member 6 is provided with a transverse groove 14 receiving lugs 15 on the inner end of a driven collar 16. The collar is in turn keyed to a driven shaft 20 as indicated at 21. Particular attention is directed to the fact that the more or less loose connection 14—15 between the members 6 and 16 extends at right angles to the drive between the members 5 and 6 so that misalignment of the driven shaft 20 and the drive shaft 23 is provided for.

Attention is invited to Figures 1, 2 and 4 which illustrate that the diameter of the floating driven element 6 is somewhat less than the diameter of the central opening in the driving element 5 thereby defining an annular recess for the reception of a restraining sleeve 30. Figures 4 and 5 clearly illustrate that the restraining sleeve is provided with a pair of oppositely arranged openings 31 uniformly decreased in width toward the ends thereof and adapted to receive the driving balls 9 so that the balls may have operative engagement with the walls of the openings 7 and 10. It is only the intermediate portions of the openings 31 which are of sufficient diameter to permit of the driving engagement of the balls 9 with the walls of the openings 7 and 10 and for that reason the enlarged intermediate portions of the openings 31 must be in alignment with the openings 7 and 10 for the proper transmission of power.

In use, when the torque exceeds a predetermined point the balls 9 will have pressure engagement with the converging side walls of the openings 31 and the balls will thereby be moved inwardly to the position shown in Figure 4. Since the converging side walls of the openings 31 have engagement with the balls 9 outwardly of the center line thereof, the balls will be moved inwardly by the continued turning of the restraining sleeve 30, so that the drive will be broken. It is important to note that the restraining sleeve has a frictional fit within the recess in the inner end of the driving element 5 and is free from any direct contact with the member 6 which would have a tendency to retard the turning of the sleeve 30 under the influence of the element 5. In summarizing the releasing feature of the invention it will be seen that the resistance to the turning of the element 6 will temporarily arrest the turning of the sleeve 30 so that the parts assume the position shown in Figure 4. The driving balls 9 are shown in Figure 4 as being housed entirely within the opening 7 and held in that position by the restraining sleeve 30.

When the drive is thus broken the parts will remain in the position shown in Figure 4 until the openings 7 and 10 are aligned by an operator and until the sleeve 30 is manually turned to a position where the enlarged intermediate portions of the openings 31 are in register with the openings 7 and 10, so that the balls 9 may move outwardly to operative position under the influence of the spring 8. It will be seen that one end of the restraining sleeve 30 is provided with a knurled ring or grip 33 of approximately the same diameter as the driving element 5 and adapted to be engaged either by the hand of the operator or a suitable tool. The registration of the intermediate portions of the openings 31 with the openings 7 and 10 is indicated by the clicking noise resulting from the rapid outward movement of the balls 9 into contact with the set screws 11. If desired an indicating mark may be provided on the surface of the ring 33 to show the location of the openings 31.

In the form of invention illustrated in Figure 6 the driven collar 40 is integral with the transversely bored member 41 which carries the balls 43 and the spring 44. In this form of the invention the drive is from the driving element 46 to the balls 43 and from the balls 43 to the member 41 as is believed to be clear.

Figure 7:
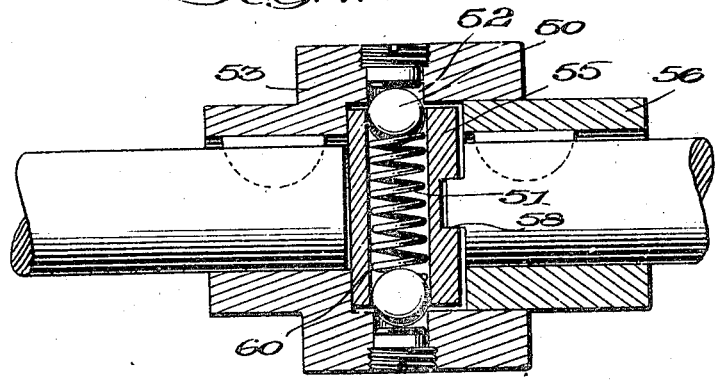
Figure 7 is a similar view through another form of the invention.

In the form of invention illustrated in Figure 7 the restraining sleeve is dispensed with and when the balls 50 are moved inwardly against the tension of the spring 51 the continued turning of the driving element 53 will result in the return of the balls 50 to the sockets 52 each time the driving element 53 turns 180 degrees. In this form of invention the balls 50 are partially received in a floating element 55 corresponding to the element 6. The floating element has connection with the driven collar 56 through the medium of a tongue and groove connection 58 extending at right angles to the transverse opening 60 in the floating member to provide for misalignment.

The invention forming the subject of this application is adapted for use in connection with the drive shafts of electric motors, printing presses, phonograph motors, taps, reamers and other machinery and provides a means whereby damage to the driven unit, as a result of overload, is inhibited. The coupling may be economically incorporated in a shaft and has no objectionable protruding parts. In addition to functioning as a safety means, the invention compensates for misalignment in the sections of a shaft so that the necessity of accurately placing all the parts of a piece of equipment is avoided.

Having thus described the invention, what is claimed is:

1. A coupling of the character specified comprising a driving element having driving faces, balls engaged by said faces, a driven element having faces engaged by said balls, means whereby the angle of contact between said balls and said first-named faces may be varied, and a restraining sleeve for holding the balls in inoperative position subsequent to their movement to that position.

2. A coupling of the character specified comprising a driving element having driving faces, balls engaged by said faces, a driven element having faces engaged by said balls, and a restraining device for holding the balls in inoperative position subsequent to their movement to that position, said restraining device consisting of a sleeve frictionally driven by said driving element.

3. A coupling comprising driving and driven elements having openings adapted for registration, balls in said openings and adapted for driving engagement with the walls thereof, retaining devices engaged with said balls, a spring urging said balls to operative position, and a restraining sleeve between said driving and driven elements and adapted to hold said balls in inoperative position subsequent to the movement of the same to that position.

4. A coupling comprising driving and driven elements having openings adapted for registration, balls in said openings and adapted for driving engagement with the walls thereof, and a restraining sleeve between said driving and driven elements and adapted to hold said balls in inoperative position subsequent to the movement of the same to that position, said restraining sleeve having means whereby the same may be manually turned.

5. A coupling comprising driving and driven elements having faces adapted to be arranged in operative relation, balls adapted for engagement with said faces, adjusting devices for said balls, and a restraining sleeve having openings receiving said balls to permit the same to have driving engagement with said faces, there being means establishing a releasable drive between the sleeve and one of the elements.

6. A coupling comprising driving and driven elements having faces adapted to be arranged in operative relation, balls adapted for engagement with said faces, adjusting devices for said balls, and a restraining sleeve having openings of elongated formation receiving said balls to permit the same to have driving engagement with said faces, the openings in said restraining sleeve being reduced in width toward the ends thereof.

7. A coupling comprising driving and driven elements having faces adapted to be arranged in operative relation, balls adapted for engagement with said faces, adjusting devices for said balls, a restraining sleeve having openings receiving said balls to permit the same to have driving engagement with said faces, the openings in said restraining sleeve being reduced in width toward the ends thereof, and a spring urging said balls to operative position, said sleeve being provided with a portion extended exteriorally of the driving element and adapted to be turned to bring the openings in the sleeve into operative relation to the faces of said driving and driven elements.

8. A coupling comprising driving and driven elements having faces adapted to be arranged in operative relation, balls adapted for engagement with said faces, and a restraining sleeve having openings receiving said balls to permit the same to have driving engagement with said faces, the openings in said restraining sleeve being reduced in width toward the ends thereof, said sleeve having frictional engagement with said driving element.

9. The combination of driving and driven elements having openings adapted for registration, balls in said openings, a spring urging said balls outwardly, said driving element having a centrally arranged opening receiving said driven element, a restraining sleeve in said centrally arranged opening in the driving element and having frictional contact with the wall thereof, said sleeve being provided with openings having converging side walls adapted to engage the balls to move the same inwardly, there being means whereby said sleeve may be manually adjusted.

10. A coupling comprising driving and driven elements having openings adapted for registration, balls in said openings, set screws carried by said driving element and engaged with said balls, and a spring confined between said balls, said driven element being floatingly mounted.

11. The combination of a pair of movable elements, a spring pressed key establishing a driving connection between the elements, and a sleeve having a releasable driving connection with one of the elements, said key being in the path of travel of and adapted to be engaged by a portion of the sleeve to temporarily arrest movement of the sleeve.

12. The combination of a pair of rotatable elements, a spring pressed key establishing a driving connection between the elements, and a sleeve having frictional contact with one of said elements and releasably rotated thereby, said key being in the path of travel of and adapted to be engaged by a portion of the sleeve to temporarily arrest rotation of the sleeve with respect to the driving element having frictional driving engagement therewith.

In testimony whereof I affix my signature.

FREDERICK FISHER.